United States Patent Office 2,808,157
Patented Oct. 1, 1957

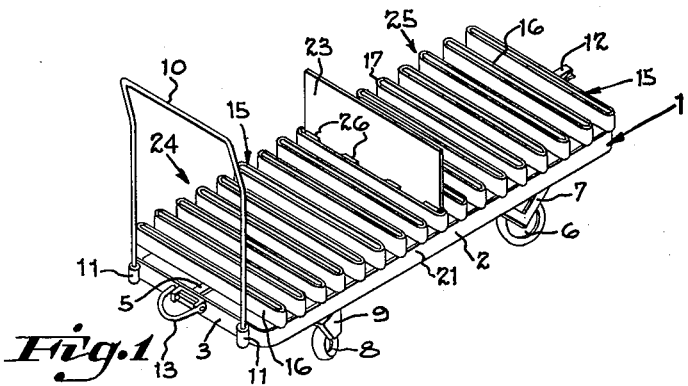
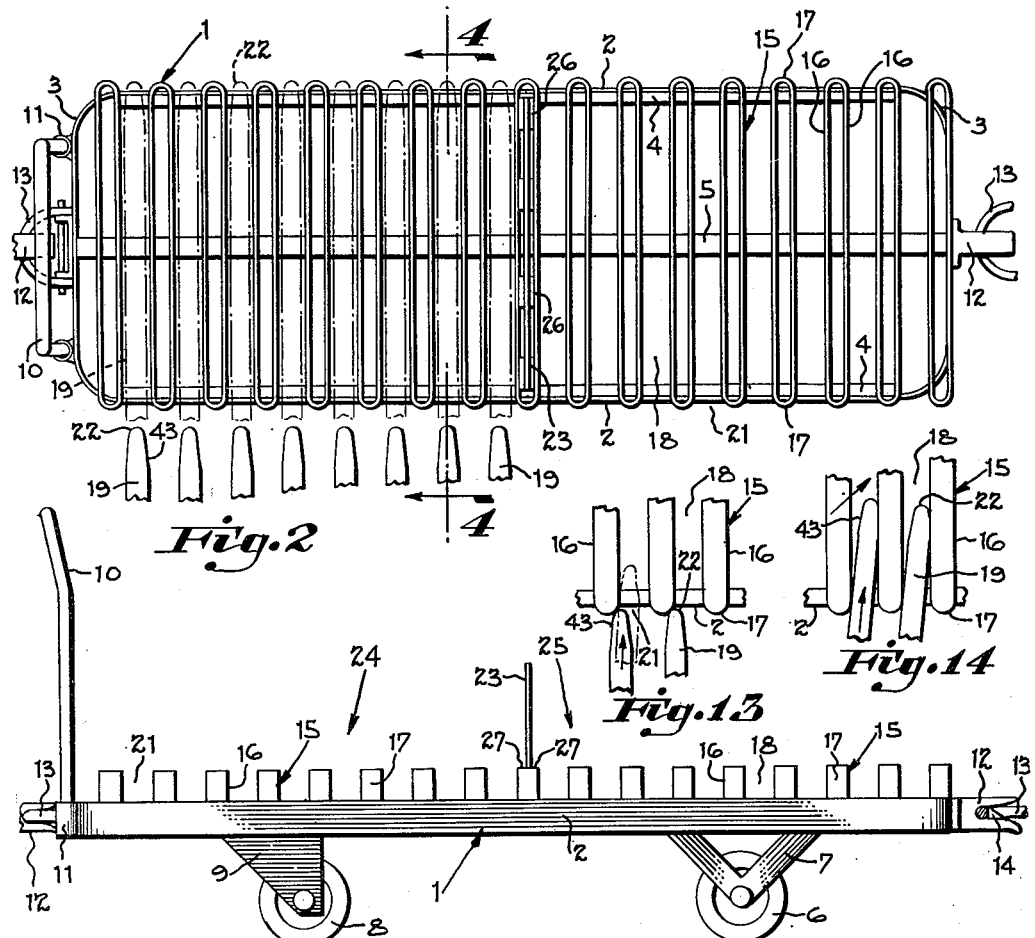

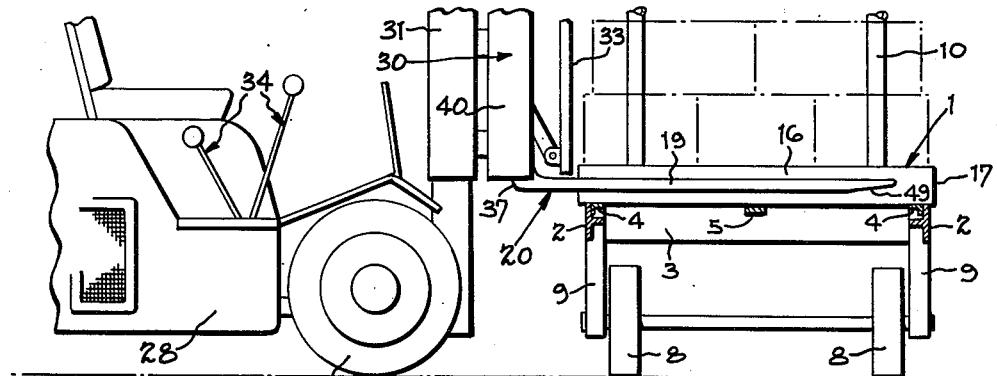
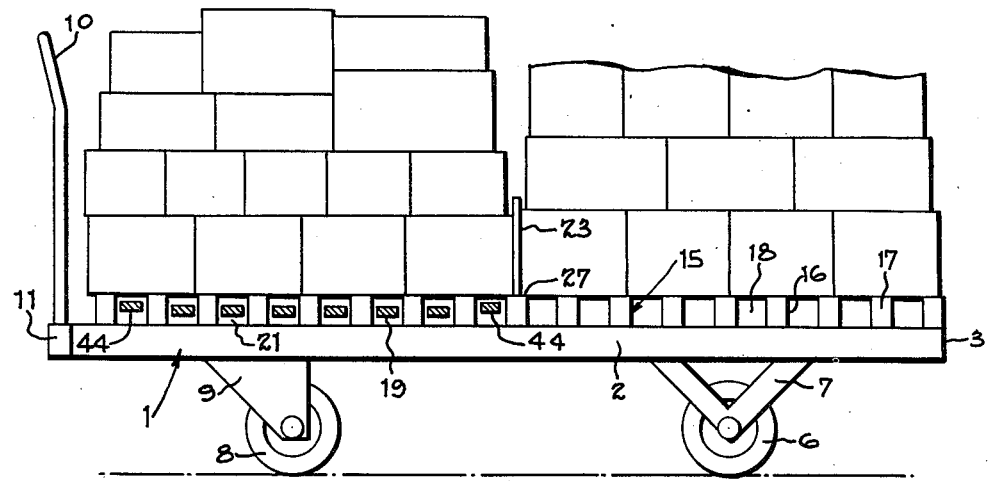
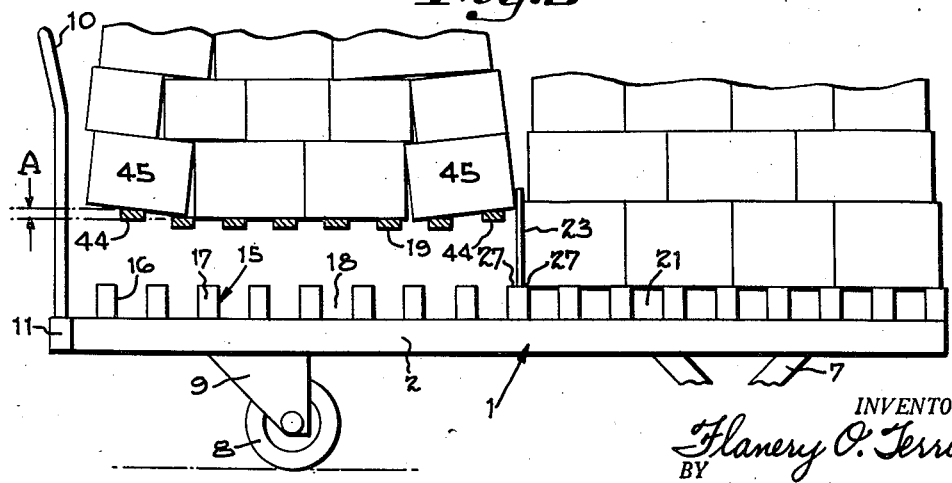

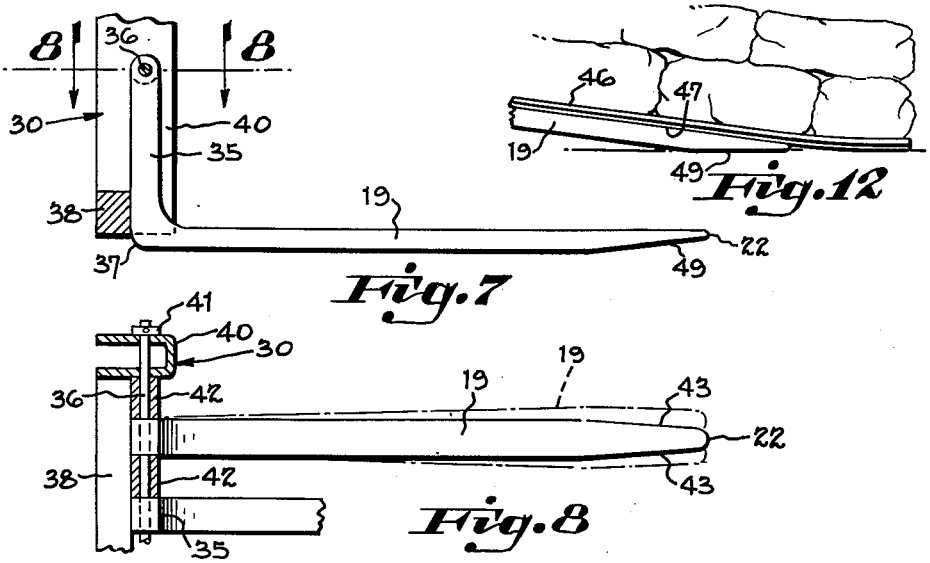
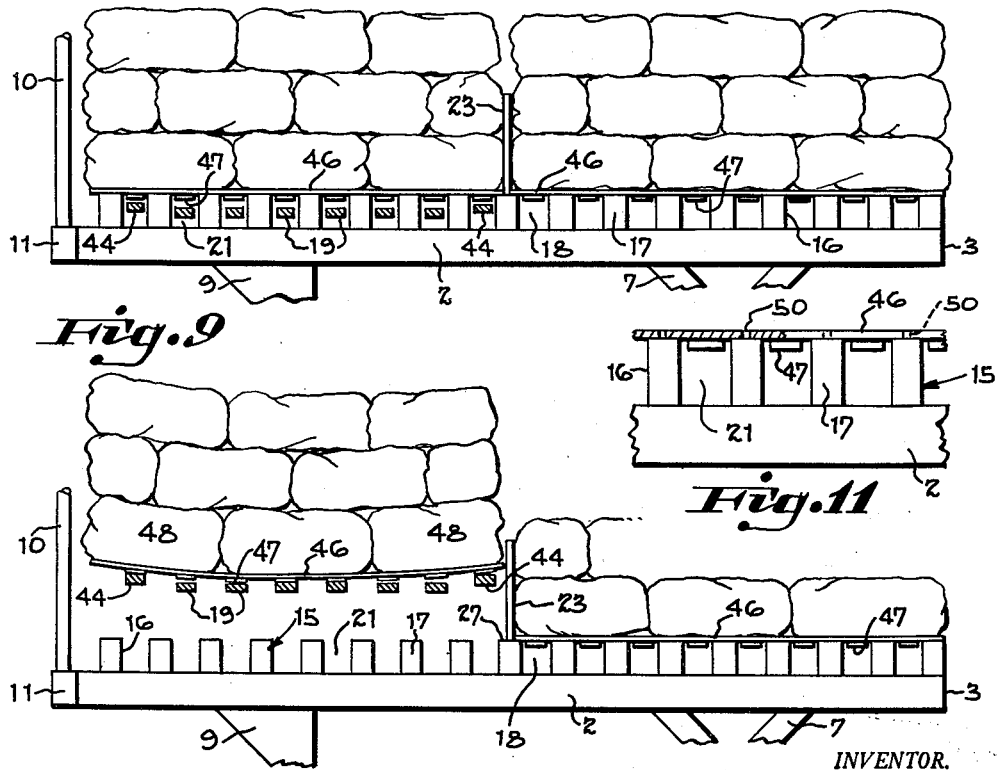

2,808,157

FORK LIFT HANDLING EQUIPMENT FOR PALLETIZED LOADS

Flanery O. Terrill, Cincinnati, Ohio, assignor to The Kroger Co., Cincinnati, Ohio, a corporation of Ohio Application August 5, 1955, Serial No. 526,699

7 Claims. (Cl. 214—38)

This invention relates to power equipment for handling bulk quantities of articles, utilizing a fork lift truck but eliminating the use of pallets commonly associated with bulk handling operations. The power equipment has been developed primarily for a retail food chain having centralized warehouses where the merchandise (usually in large heavy cartons) is stored temporarily for shipment to the retail food stores in response to orders sent to the warehouse.

According to the practice prior to this invention, the conventional raised pallets are placed upon pick-up carts; the carts are moved about the warehouse; the selected articles are stacked upon the pallets, and the loaded carts are transported to the loading platform. At this point, a fork lift truck inserts its fingers under the pallets, elevates them, then transports the loaded pallets to a motor truck or trailer for transport to the retail stores. Upon arrival at the store, the loaded pallets may be removed bodily from the truck or the merchandise may be manually removed from the pallets. In either case, the unloaded pallets are hauled back to the warehouse and there stacked for reuse.

Although this system is fairly efficient, the pallets reduce substantially the available pay load of the motor vehicle and involve handling costs upon each transfer of merchandise.

It has been a primary object of the present invention to provide power handling equipment which has all the advantages of the fork lift handling system, but which eliminates the use of pallets, thereby increasing the pay load of the motor trucks, eliminating the cost of pallet handling and improving the overall efficiency of bulk merchandise handling.

According to the invention, a pick-up cart having spaced load-supporting ribs coacts with an improved lift finger structure on a lift truck, the lift fingers interfitting the load-supporting ribs for direct engagement with the stacks of cartons resting upon the tops of the ribs. In practicing the invention, the worker stacks the selected articles directly upon the load-supporting ribs; the lift truck operates his vehicle to insert the lift fingers endwisely between the ribs and beneath the load, then the finger assembly is elevated to lift the load from the ribs for transfer to the motor truck where it is shifted by a pusher from the finger assembly to the truck floor.

The ribs are spaced apart a distance to create slots which are larger than the lift fingers for convenient endwise insertion. However, the fingers are shorter than the width of the pick-up cart to prevent their ends from protruding beyond the side of the load as it is transferred to the truck. This prevents possible damage to the cartons resting on the truck floor or to the truck itself and is rather critical because each stack is unloaded as closely as possible to the wall or to the stacks already unloaded.

In its preferred form, the cart includes a divider extending transveresly across its center, splitting the load into two sections. The number of slots of each load section correspond to the number of fork lift fingers. The divider serves as a guide in placing the cartons upon the cart and prevents inetrference between the two stacks as one stack is lifted from its section of the cart.

Another advantage of the invention resides in an improved mounting arrangement, whereby the lift fingers individually are free to float in a horizontal plane, allowing the fingers to guide themselves into the slots as they are advanced into them. The self-guiding action is improved by rounding the coacting ends of the support ribs and lift fingers to create a camming action which shifts the floating fingers laterally into alignment with the slots between the ribs.

Another advantage residing in the coacting lift fingers and spaced ribs is the creation of a force reacting between the sides of the ribs and fingers, which shifts the ribs and pick-up cart bodily into alignment with the fingers as the fingers are inserted endwisely into the slots.

This action is brought about by tapering the outer end portions of the fingers at an angle related to the width of the slot. If the fingers are not aligned with the slots as they approach the cart, but are canted laterally as noted above, the tapered end portions permit entry of the misaligned fingers a substantial distance without binding friction between the fingers and ribs. This allows the fingers to align the ribs and cart as they advance further into the slots. The arrangement of the floating fingers and coacting camming action of the ribs and fingers greatly simplifies the operation of maneuvering the lift truck to its load pick-up position.

A further object of the invention has been to provide a novel arrangement of lift fingers to stabilize the stack of articles on the fingers, thereby to prevent any part of the load from dropping accidently while the stack is in transit from the pick-up cart to the motor truck.

For this purpose, one or more stabilizing fingers at each side of the main group of spaced fingers resides in an elevation above the common plane of the main group. The stabilizing fingers create a tilting action which cants inwardly the row of cartons or articles along opposite sides of the stack, thus firming and stabilizing the stack after it is lifted from the ribs of the cart.

A further object of the invention has been to provide a rib structure for the pick-up cart which is of light weight design and low cost, utilizing relatively thin metal strips which are bent to elongated loop formations to create rounded opposite ends which delineate the camming surfaces noted above. Each rib thus consists of a pair of spaced side walls, each providing two load supporting top edges.

A preferred embodiment of the present invention is disclosed in the accompanying drawings and description which follows.

In the drawings:

Figure 1 is a perspective view of the pick-up cart or trailer provided with load supporting ribs for coaction with the lift finger assembly.

Figure 2 is an enlarged top plan view of the pick-up cart of Figure 1, showing the load supporting ribs and interfitting fork lift fingers.

Figure 3 is a side elevation of the cart projected from Figure 2.

Figure 4 is a cross section taken on line 4—4 of Figure 2, showing the cart and a portion of the lift truck with the lift fingers in unloading position.

Figure 5 is a diagrammatic side view similar to Figure 3, showing the cart and its load with the lift fingers in position to lift the load from the cart.

Figure 6 is a view similar to Figure 5, showing the action of the lift fingers in removing the load from the cart.

Figure 7 is an enlarged fragmentary view illustrating the mounting structures which provides the floating action of the lift fingers with respect to the hoist frame of the lift truck.

Figure 8 is a sectional view taken on line 8—8 of Figure 7 further detailing the lift finger mounting structure.

Figure 9 is a diagrammatic view similar to Figure 5, showing the use of a flexible load platform which converts the pick-up cart to the handling of fragile merchandise, such as fruit and vegetables.

Figure 10 is a view similar to Figure 9, showing the action of the flexible platform as the load is lifted.

Figure 11 is an enlarged fragmentary view detailing the flexible load platform in relation to the support rails.

Figure 12 is a fragmentary view showing the action of the platform as the load is shifted from the lift fingers to the floor of the transport truck or trailer.

Figure 13 is a diagrammatic plan view, showing the camming action of the floating lift fingers against the rounded ends of the ribs in guiding the fingers into the slots.

Figure 14 is a view similar to Figure 13, showing the fingers shifting the ribs and pick-up carts into alignment during endwise advancement of the misaligned fingers into the slots.

Described generally with reference to Figures 1 to 3, the pick-up or stock-assembly cart 1 comprises a frame having a pair of longitudinal side rails 2—2 joined at opposite ends by cross rails 3—3. The rails are fabricated from structural steel, generally T-shaped in cross section including an angle iron 4 secured near the upper edge of the members, as shown in Figure 4. In addition, the frame includes a longitudinal rail 5 extending along its center.

The cart is supported upon rear wheels 6, carried by fixed brackets 7, and front wheels 8 journalled in swivel brackets or casters 9. The fixed brackets and swivels are secured to the cart frame in the conventional manner. The forward end of the cart includes a U-shaped hand grip 10 rising from sockets 11—11 secured to the cross rail. As best shown in Figure 2, the cart further is provided with automatic couplers at opposite ends as indicated at 12 and 13. These are attached to the cross rails 3. The couplers are standard units which engage automatically and which provide a swivelling connection between the pick-up carts when several of them are coupled together to form a train. As best shown in Figure 3, the female coupler 12 includes an open slot and male coupler 13, of the adjoining vehicle, consists of a hinged, semi-circular bar interfitting the slot and locked therein by a latch element 14.

The load supporting surface of the cart consists of a series of ribs 15 spaced apart from one another and extending transversely across the cart frame. As viewed from above in Figure 2, each rib is formed of a strip of flat metal bent to an elongated loop formation to delineate parallel side walls 16—16 joined at opposite ends by curved end sections 17—17. The ribs are secured in position upon the chassis preferably by welding the lower edges of the side walls to the rails and to the longitudinal center bar 5.

Each support rib thus provides a pair of spaced, load bearing edges collectively residing in a common plane above the surface of the cart frame, as best shown in Figure 3. The individual ribs are spaced apart from one another to provide a series of open slots 18 for the reception of the lift fingers 19 of the lift assembly, indicated generally at 20. As indicated in Figures 5 and 6, the ribs are spaced apart a distance substantially greater than the width of the lift fingers 19 and each rib rises above the cart a distance substantially greater than the thickness of the fingers to provide adequate clearance for the fingers as they are inserted into the slots.

The loop formation of the support ribs has the advantage of providing a light but strong load support structure and the rounded end sections of the ribs provide a converging slot entryway 21 having camming surfaces which coact with the rounded ends 22 of the lift fingers 19 to guide the fingers into the slots. It is to be noted at this point, that the length of the support ribs 15, as indicated in broken lines in Figure 2, is equal to the effective length of the lift fingers 19 to prevent the ends of the fingers from projecting beyond the side edge of the cart when fully inserted.

As best shown in Figure 1, the cart includes an upstanding divider 23 extending transversely across the cart at its longitudinal center. The divider splits the cart into two load sections 24 and 25. The divider facilitates the loading operation since it serves as a guide against which the packages are placed; it also serves as a load separator for unloading.

It is to be noted that the number of fingers of the lift assembly 20 is equal to the number of slots 18 of each load section of the cart. In the example illustrated, each load section includes 8 slots corresponding to the 8 fingers of the lift assembly. This provides adequate support of the entire load of each section. It will be noted in Figure 6, that the divider 23 prevents interference with the adjoining stack of merchandise as one stack is lifted from the support ribs.

The divider preferably is in the form of a metal plate or panel having mounting blocks 26 welded to its lower edge portion. The blocks fit between the spaced side walls 16 of the center support rib and preferably are welded thereto securing the panel permanently in position. It is found in practice that the height of the divider panel above the plane of the support ribs is not critical since it is used as a guide in placing the first row of packages upon the ribs and as a separator for unloading.

It is to be noted in Figures 5 and 6, that the divider reduces the width of the center rib approximately by half and delineates the two ledges indicated at 27—27. In loading a row of cartons along the divider, it is necessary to place them in contact with the divider in order to rest the outer edges of the cartons upon the ledges of the central rib. The outer edge of the row of cartons thereby is in position to be engaged by the outer lift finger in a positive manner. This prevents cartons, particularly small ones, from dropping from the lift assembly as the load is elevated from the cart.

In practicing the invention, the improved lift assembly 20, may be mounted upon a conventional lift truck as indicated at 28 in Figure 4. In general, the lift truck includes a power motor for raising and lowering the lift assembly and for propelling the truck and its load. As shown, the truck includes a vertical hoist frame 30 mounted for movement relative to a vertical column structure 31 residing between the front wheels 32. The hoist frame 30 includes a conventional pusher 33 mounted in vertical position above the lift fingers 19 and movable outwardly to shift the load from the fingers. The column structure 31 has its lower end pivotally connected to the truck and is movable by power to an inclined position to facilitate load handling. The vehicle is provided with control levers indicated generally at 34 for raising and lowering the hoist frame, actuating the pusher, and inclining the column structure. The structure so far described is conventional and therefore is not detailed in the drawings.

Referring to Figures 7 and 8, the present lift fingers 19 are generally L-shaped as viewed from the side, the vertical arm portion 35 of each finger having its upper end pivotally connected to a cross shaft 36 with the heel portion 37 resting against a stop bar 38. The opposite ends of shaft 36 project through the upright side members 40—40 of the hoist frame 30, the shaft being confined endwisely by collars 41. The stop bar 38 extends transversely between the uprights 40 and has its opposite ends secured to the uprights preferably by welding.

Each lift finger is thus suspended from the shaft, the horizontal portion of the finger extending outwardly in cantilever fashion, with the weight load of the finger reacting against the stop bar. The fingers are free to pivot upwardly if they encounter an obstruction during their downward motion. This prevents damage to the fingers or to an object which the fingers may contact.

As indicated in broken lines in Figure 8, each finger is free to float or shift laterally within limits, to facilitate entry of the fingers into the entryways 21 of the slots 18. For creating the floating action, the pivoted ends of the fingers are loosely fitted upon the cross shaft 36. The fingers are held in spaced relationship upon the shaft by the collars 42 residing on the shaft and loosely fitted between the several fingers.

Each entryway 21 forms a curved, converging passageway (Figure 2) and provides a camming action for guiding the fingers as they advance endwisely into the slots. In addition to the curved outer end 22, the outer end portion of each finger tapers as at 43—43, forwardly toward the curved outer end 22. If the fingers are not aligned with the ends of the slots upon approaching the cart to pick up the load, then the curved ends 22 cam against curved entry surfaces and shift the floating fingers laterally as indicated in Figures 13 and 14.

In the event that the fingers approach at an angle to the slots, or are shifted laterally as noted, the tapered portions allows partial entry as indicated diagrammatically in Figure 14, one tapered side 43 being parallel with one side of the slot as indicated. The angle of the taper is related to the width of the slots and limits of floating movement (Figure 8) to permit the fingers to enter to the extent indicated. In this position, the tapered end has advanced far enough to practically eliminate the frictional binding effect between the fingers and ribs, making it possible for the advancing fingers to shift the cart angularly in a direction to align the ribs and slots with the fingers. The casters 9 swivel in response to the direction of applied angular force.

In order to stabilize the stack of cartons upon the fingers during transport, two stabilizing fingers, indicated at 44—44 and residing along opposite sides of the lift assembly 20, are mounted in a plane above the fingers 19. The elevation of the stabilizing fingers is indicated at A in Figure 6. The stabilizing fingers tilt the rows of cartons 45—45, along opposite sides of the stack inwardly to stabilize the load as indicated in Figure 6.

As noted earlier, the present handling mechanism is intended primarily for transferring cartoned merchandise to motor trucks or trailers for transport to individual retail chain stores. According to the modern practice, the bulk merchandise is packed in cardboard cartons, to protect the merchandise against damage in shipment and handling. The cartons of merchandise are stacked in the warehouse in an orderly way for convenient selection in filling the orders sent by the retail stores.

The most widely used procedure, up to the present time, involves the use of pallets in filling the orders at the warehouses. The warehouse worker places one or more pallets upon a pick-up cart or, in large operations, upon a train of carts coupled together and pulled by a power towing vehicle. The worker guides the train to the various storage sections, stacks the selected cartons upon the pallets, and when the order is filled, conveys his train of loaded carts to a transfer point, such as the loading platform of the warehouse. At this point, another worker transfers the loaded pallets to the truck, using a power fork lift truck, to elevate the loaded pallets from the cart and transfer them to the floor of the truck.

At the retail store, the merchandise usually is removed from the pallets manually although in some cases the loaded pallets may be removed bodily to allow the driver to make other deliveries with the least delay. In either case, the use of pallets saves a great many man hours, since they make it possible to utilize power equipment to handle large quantities of heavy cartons rapidly and efficiently.

On the other hand, the pallets decrease the allowable pay load of the truck and introduce pallet handling costs. By way of example, the average pallet weighs approximately 40 pounds and an average truck load consists of 25 loaded pallets, totaling 1000 pounds of pallet weight which must be deducted from the pay load. The pallet handling costs are also substantial because they must be conveyed to the carts at the warehouse and must be unloaded at the warehouse and stacked for reuse.

The present mechanism provides the advantages of pallets but eliminates the handling costs and the loss of pay load and handling costs. In practicing the present invention, the hand carts are loaded at the warehouse according to the store order as outlined above, the cartons being placed directly upon the load supporting surface formed by the ribs. At the transfer point, as indicated in Figures 4, 5 and 6, the fork lift operator drives his vehicle forwardly to insert the fingers 19 into the slots, elevates the lift assembly to pick up the load, then, with the load resting upon the fingers, drives the lift vehicle into the motor truck. The load is then deposited upon the truck floor by first lowering the fingers, then actuating the pusher 33 to withdraw the fingers from beneath the bottom of the stack. During withdrawal, the lift vehicle preferably is shifted into neutral so as to allow the pusher to force the lift vehicle away from the load as the fingers are withdrawn. This causes each stack of cartons to be pushed compactly against the stack which was deposited, previously in the truck.

As noted earlier, the load stabilizing fingers 44 at opposite sides of the stack causes the cartons 45 on opposite sides to be canted inwardly. The load axis of the cartons is thus shifted inwardly to firm the load and prevent the dropping of any cartons from the fingers during transport to the truck. It will also be noted in Figure 6, that the divider 23 prevents the carton 45 from disturbing the cartons in the adjoining section 25 as the load is lifted. The divider provides the further advantage of locating the cartons 45 in a positive manner relative to the finger 44 to insure engagement of the finger 44 with the edge of the row of cartons.

In handling fragile merchandise, for example, fruits and vegetables, which ordinarily are packaged in fabric or paper bags, it is found that less bruising and damage takes place if the containers are stacked upon a somewhat flexible surface. In addition, the more perishable merchandise of this class often is transported in refrigerator trucks or trailers to preserve it. For best results, the bags are stacked upon pallets or the like which space them above the floor for circulation of air beneath and between the stacks while in transport or storage.

Although produce represents only a small percentage of the total quantity of merchandise handled, the present equipment can be converted in a simple manner, utilizing the hand cart ribs to support a flexible platform which protects the merchandise and which spaces it for air circulation.

It will be understood that the upper edges of the walls of the ribs 15 may be covered to present flat support surfaces for such material; however, it has been found that the flexible platform creates superior results since it forms the pliable surface and spaces the stacks for air circulation. The flexible platform arrangement is illustrated in Figures 9 to 12 inclusive.

The protective platform 46 consists of a relatively thin sheet of plywood or sheet metal having on its underside a series of spaced, parallel runners 47 interfitting the ribs 15 and residing in the slots. The runners may be formed of plywood or the like to protect the flexible platform from damage by the fork lift fingers. As shown in Figure 10, the fork lift fingers 44—44 have the same load stabilizing action upon the produce bags 48 since the flexible platform readily yields to conform to the plane of the lift fingers. Upon being deposited upon the floor of the truck, the hoist column is shifted to its inclined position to position the tapered lower surface 49 of the fingers flush with the floor surface (Figure 12). The platform 46 is flexible both longitudinally and transversely and, as indicated in Figure 12, it bends as indicated to conform to the angle between the floor surface and supporting fingers. This permits the fingers to be withdrawn readily from beneath the loaded platform.

As shown in Figure 11, the flexible platform is provided with apertures 50 for the drainage of water, the apertures preferably located along lines which register with the open tops of the ribs when placed upon the cart with the slats between the ribs. This allows the water to drip directly to the floor. It will be noted that the runners 47 collectively provide a firm support, allowing the use of a highly flexible sheet for the platform. On the other hand, the spacing of the runners allows the portions of the sheet between the ribs to bow under the weight load for the desired flexibility with the sheet elevated sufficiently for air circulation. Because of the light weight of the platform, the pay load and handling factors are not serious.

It will be understood, that the principles of the invention can be applied to handling operations other than those disclosed, for example, in loading the merchandise into the warehouse for storage. In this case, the sequence is reversed; the stacks are transported by the fork-lift mechanism to the pick-up cart then transferred to the cart by lowering the lift fingers into the spaces between the ribs. The disclosure in relation to warehouse handling has been selected to demonstrate the principles and utility of the invention; other industrial uses of the equipment will be readily visualized.

Having described my invention, I claim:

1. A power-driven mechanism for handling stacks of heavy articles comprising a pick-up cart to convey the stacks from a storage area, a load transfer mechanism coacting with said cart, a plurality of parallel load support ribs mounted upon the cart, said ribs spaced apart from one another and delineating open slots extending along the cart, the opposite ends of the ribs being rounded, said ribs having upper edges residing in a common plane above the cart and forming a load support surface, the spacing of the ribs related to the size of the articles to provide at least two ribs in supporting engagement with the bottom of each stack, a plurality of spaced lift fingers extending horizontally from the transfer mechanism, the spacing thereof correseponding to the spacing of the slots, the fingers interfitting the slots, pivotal mounting means securing each finger individually to the transfer mechanism, said pivotal mounting means providing lateral swinging movement of the fingers indivdually relative to one another in said horizontal plane in two directions, said pivotal mounting means limiting the lateral motion of the fingers, whereby the ends of the fingers are free to swing laterally for a distance less than the spacing of said load support ribs, the lift mechanism shifting the fingers as a unit in a horizontal and vertical path for insertion endwisely into the slots during horizontal movement thereof, the ends of the floating fingers engaging the rounded ends of the ribs and being guided laterally into alignment with the slots as the fingers are inserted endwisely into the slots, the fingers elevating the stack from the ribs upon movement along the vertical path, and pusher means on the transfer mechanism above the lift fingers, the pusher means engageable with the side of the stack for shifting the stack horizontally from the lift fingers to a support surface after transfer of the stack from the cart.

2. A power-driven mechanism for handling stacks of articles comprising a pick-up vehicle having a plurality of spaced parallel load-support ribs mounted thereon, each of said ribs comprising a strip length of material folded over upon itself in the form of an elongated loop having spaced, parallel side walls joined at opposite ends by curved end sections, the side walls of the ribs projecting vertically from the vehicle and having upper edges residing in a common plane delineating a load-supporting surface spaced above the vehicle and supporting a stack of articles, the spacing of the ribs providing slots therebetween, the curved end sections of the ribs delineating converging entryways at opposite sides of the cart leading to the slot, a power-operated load transfer mechanism coacting with the ribs, the load transfer mechanism including a plurality of spaced lift fiingers residing in a generally horizontal plane, the spacing of the lift fingers corresponding to the spacing of said slots, and pivotal mounting means securing each finger individually to the transfer mechanism, said pivotal mounting means providing limited pivotal motion of the fingers individually relative to one another in said horizontal plane, said fingers movable by the transfer mechanism as a unit along a vertical horizontal path for insertion endwisely through said converging entryways into the slots during horizontal movement, the entryways engaging the ends of the floating fingers and camming the same laterally into the slots during advancement through the entryways.

3. A mechanism for handling stacks of articles comprising a pick-up cart having a plurality of spaced, parallel load support ribs mounted thereon, said ribs extending transversely across the cart and rising upwardly to a plane above the cart, the upper edges of the ribs providing a support surface for said stacks of articles, a divider rising upwardly from the cart and extending transversely across the longitudinal center thereof, the divider separating the cart into two load bearing sections, a transfer mechanism coacting with the cart for transferring the stacks of articles to and from said sections, a group of spaced lift fingers projecting from the said transfer mechanism in a common horizontal plane, a respective stabilizing finger spaced along the opposite sides of said group of lift fingers and residing in a plane above the common plane of said group of fingers, the stabilizing fingers tilting the opposite sides of a stack of articles inwardly and thereby stabilizing the stack supported on the fingers, the spacing of said ribs related to the size of the articles and providing at least two ribs in supporting engagement with each article at the bottom of the stack, the spacing of said lift fingers corresponding to the spacing of the said ribs and loosely interfitting the spaces between the ribs, the lift fingers being related in number to the spaces between the ribs of one of said load bearing sections, the transfer mechanism shifting said fingers as a unit along a horizontal and vertical path for insertion endwisely into the spaces of one section in a plane beneath the stack of articles resting upon the ribs to transfer the stack to or from the ribs of one section upon vertical movement of the fingers, said divider guiding the stack relative to the stacks of the other load section during said vertical stack motion.

4. A power-driven mechanism for handling stacks of articles comprising a pick-up cart having a series of spaced ribs thereon, the ribs having upper edges providing a stack supporting surface, the spacing of the ribs creating open spaces therebetween, a lift mechanism, a plurality of lift fingers spaced apart from one another and extending in a generally horizontal plane from the lift mechanism, pivotally mounting means connecting said lift fingers individually to the lift mechanism, said pivotal mounting means providing limited pivotal movement of the fingers individually relative to one another in said horizontal plane, said fingers being shifted by said mechanism in a horizontal path into the spaces between the ribs, the fingers interfitting the spaces between the ribs, each finger having a tapered outer end, the length of the tapered outer ends being greater than the spacing between the ribs, the tapered ends of the fingers engaging the rounded ends of the ribs and being pivoted laterally by camming action into alignment with the spaces between the ribs and at an angle thereto as the fingers are inserted endwisely therein, the related spacing of the ribs and length of the tapered outer ends providing insertion of the fingers between the ribs at said angle for a distance at least twice the width of the space between the ribs, the tapered ends of the fingers at one side thereof engaging the ribs substantially in parallel relationship and providing a slide bearing, whereby continued endwise motion of the fingers reacts as a camming force shifting the ribs and cart angularly into alignment with the fingers.

5. A load transfer mechanism for handling stacks of articles relative to a pick-up cart having a plurality of spaced, load-support ribs for supporting the stacks, said ribs having cam surfaces on an end thereof, said load transfer mechanism comprising a hoist member movable in a vertical and horizontal path, a plurality of lift fingers, each of said fingers being generally L-shaped as viewed from the side providing a generally vertical arm and a horizontal lift finger portion, pivot means on the hoist member suspending the upper portion of said vertical arms from the hoist member, stop means on the hoist member residing below said pivot means and engaging the lower ends of the vertical arms on the side opposite the lift fingers, the pivot means and stop means supporting the lift fingers in cantilever fashion with the weight load of the fingers reacting against the stop means, said fingers being movable upwardly by pivotal movement about the said pivot means, respective spacer elements loosely confined between the arms and spacing the lift fingers relative to one another a distance corresponding to the spacing of the ribs of the pick-up cart, the pivot means providing clearance for lateral floating movement of the fingers individually relative to one another in both directions in a horizontal plane, said pivot means limiting the floating movement of the fingers, whereby the ends of the fingers are movable laterally for a distance less than the spacing of said load support ribs said fingers interfitting the spaces between the ribs of the pick-up cart, whereby upon horizontal endwise motion of the fingers by the hoist member toward the spaces between the ribs, the outer ends of the floating fingers engage the cam surfaces of the ribs and are cammed laterally in the horizontal plane and guided endwisely between the ribs.

6. A load transfer mechanism for handling stacks of articles relative to a pick-up cart having a plurality of spaced parallel load support ribs for supporting the stacks, said load transfer mechanism comprising a hoist frame movable in a vertical and horizontal path, a plurality of lift fingers, each of said fingers being generally L-shaped as viewed from the side providing a generally vertical arm and a horizontal lift finger portion, a cross shaft extending horizontally across the hoist frame, said shaft passing loosely through the upper ends of said vertical arms and suspending the same from the shaft, a stop bar residing below said cross shaft and extending across the hoist frame, said stop bar engaging the lower ends of the vertical arms on the side opposite the lift fingers, the cross shaft and stop bar supporting the lift fingers in cantilever position with the weight of the fingers reacting against the cross bar said fingers being movable upwardly by pivotal movement about the cross shaft, respective spacer elements loosely confined on the shaft between the arms and loosely spacing the lift fingers relative to one another a distance corresponding to the spacing of the ribs of the pick-up cart, the pivot mounting of the arms to the cross shaft providing clearance for lateral floating movement of the fingers individually relative to one another in a horizontal plane in either direction, said fingers interfitting the spaces between the ribs of the pick-up cart, the outer ends of the fingers tapering inwardly from opposite sides, whereby upon horizontal endwise motion of the fingers by the hoist mechanism toward the spaces between the ribs, the tapered sides of the floating fingers engage the sides of the ribs and cam the fingers and ribs into alignment for insertion of the fingers endwisely between the ribs.

7. A mechanism for handling stacks of fragile articles comprising, a pick-up cart, a plurality of spaced, parallel load support ribs mounted on the pick-up cart, each of said ribs comprising a pair of spaced, parallel side walls formed of stiff sheet material the side walls of the ribs projecting vertically from the cart and having upper edges delineating a load supporting surface above the cart, a flexible load supporting platform resting upon said load supporting surface, said platform comprising a panel formed of relatively thin, flexible sheet material, a load transfer mechanism coacting with the load support ribs for transferring the platform and articles from the ribs, the load transfer mechanism including a group of lift fingers in a generally horizontal plane, the spacing of said fingers corresponding to the spacing of said ribs, the fingers fitting in a generally horizontal plane, the spacing of said fingers corresponding to the spacing of said ribs, the fingers fitting loosely into the spaces between the ribs, and a respective stabilizing finger spaced along opposite sides of the group of lift fingers in a plane above the group, the fingers being movable as a unit by the transfer mechanism along a horizontal path below the plane of the flexible platform into the spaces between the ribs and vertically to engage and elevate the platform and its load from the ribs, the said elevated stabilizing fingers bowing the side portions of the flexible platform upwardly, thereby to cant the opposite sides of the stack inwardly to stabilize the stack upon the platform during transfer by the lift fingers.

References Cited in the file of this patent

UNITED STATES PATENTS

| | | |
|---|---|---|
| 1,306,158 | Walker | June 10, 1919 |
| 1,373,513 | Ladd | Apr. 5, 1921 |
| 2,103,649 | Sullivan | Dec. 28, 1937 |
| 2,239,135 | Wehr | Apr. 22, 1941 |
| 2,271,624 | Cochran | Feb. 3, 1942 |
| 2,451,226 | Kemp | Oct. 12, 1948 |
| 2,634,931 | Weitzel | Apr. 14, 1953 |
| 2,698,696 | Strong | Jan. 4, 1955 |